W. A. Wood,
Mower.
No 23,056. Patented Feb. 22, 1859.
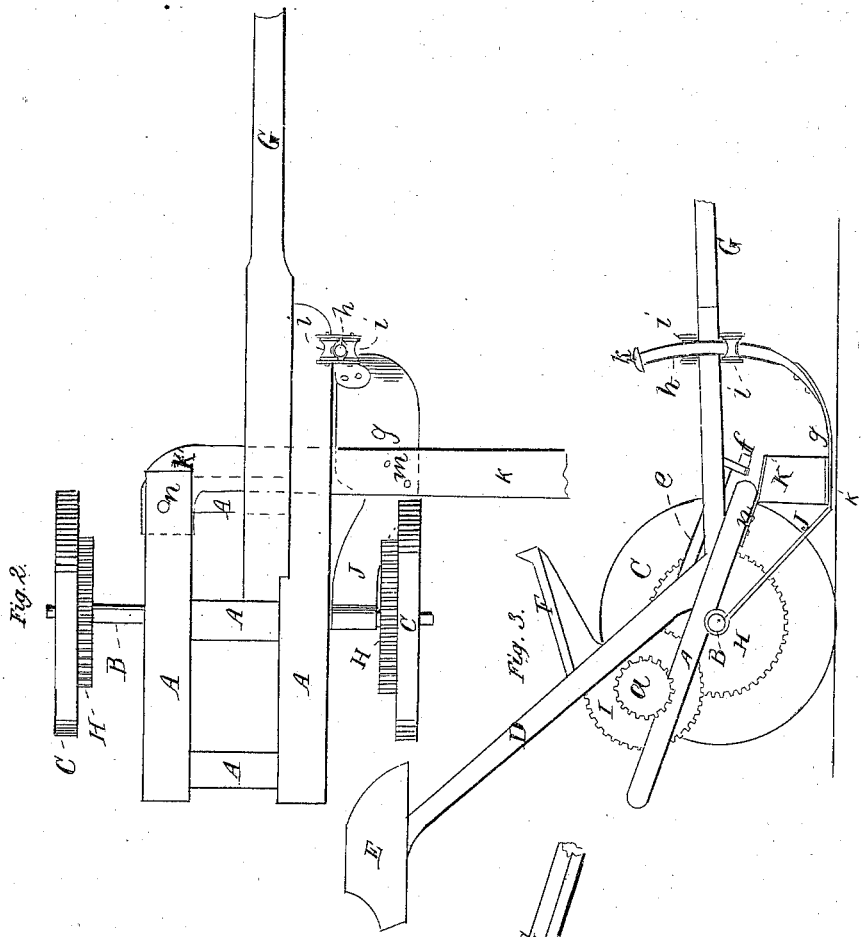
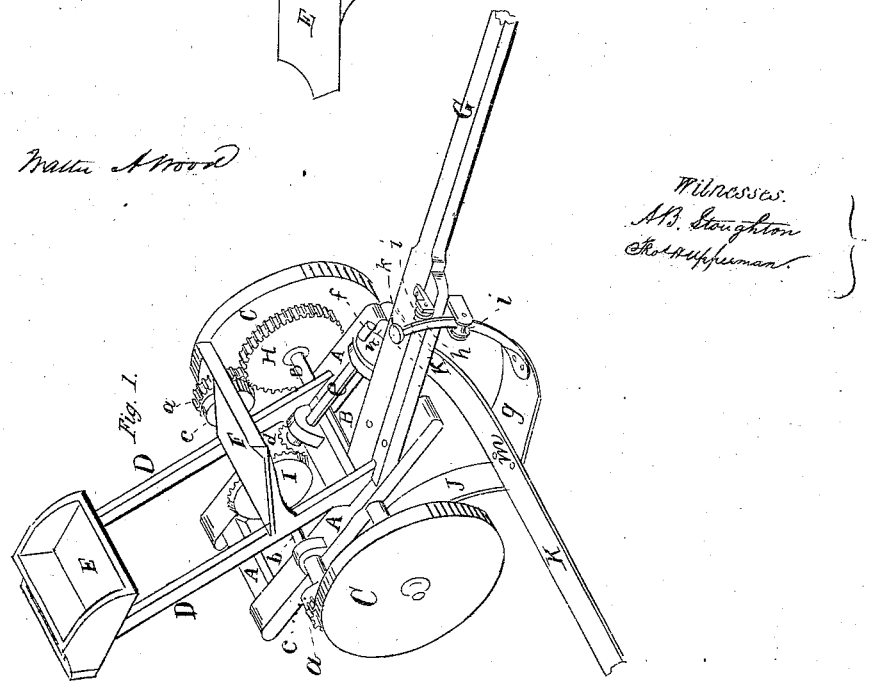
Walter A Wood
Witnesses.
A B Stoughton
Rob't A Chapman

United States Patent Office.

WALTER A. WOOD, OF HOOSICK FALLS, NEW YORK.

IMPROVEMENT IN HARVESTERS.

Specification forming part of Letters Patent No. 23,056, dated February 22, 1859.

*To all whom it may concern:*

Be it known that I, WALTER A. WOOD, of Hoosick Falls, in the county of Rensselaer and State of New York, have invented certain new and useful Improvements in Grass-Cutting Machines; and I do hereby declare the following to be a full, clear, and exact description of the construction and operation of the same, reference being had to the accompanying drawings, making a part of this specification, in which—

Figure 1 represents a perspective view of the machine. Fig. 2 represents a top plan, and Fig. 3 represents a side view with the wheel removed to show better the parts behind it.

Similar letters of reference, where they occur in the separate figures, denote like parts of the machine in all the drawings.

This invention has for its object the rendering of a grass-cutting machine or mower more cheap and light than those at present constructed for this purpose, the advantages of which construction are more fully set forth in an application marked "A" and filed at an even date herewith, and may be briefly stated as offering the facilities of a good mowing-machine to every farmer, making it of so light draft as to be easily worked by any team, while it is as effective and durable as any of the heavier machines of the present day; and the nature of my invention consists in the manner in which I connect the finger-bar to the main frame, so that while the driver in his seat may ease the machine over the greater obstructions the finger-bar by its own elasticity and the loose connection of it in part to the frame will raise and lower itself over the lesser inequalities in the ground.

To enable others skilled in the art to make and use my invention, I will proceed to describe the same with reference to the drawings.

A represents a rectangular frame, balanced upon an axle, B, which axle is supported in two carrying and driving wheels, C C. The arms D D, to which the driver's seat E and foot-support F are attached, are connected to the main frame at a point nearly perpendicular over the axle B, and act, in connection with the weight of the driver in his seat, as levers to raise or lower the forward end of the frame, inasmuch as they project far to the rear end of the frame. The tongue G is a stiff one. Its heel is close up to the axle, and projects forward and upward, so that its point may be connected to the breasts or necks of the team, and it serves as a counter-lever to the arms D.

The wheels C C, I make very low—say from twenty-two to twenty-four inches diameter. On their inner faces are made the cogged gears H H, which take into pinions $a$ $a$ on the ends of a shaft, $b$, and give motion to said pinions. Immediately joining these pinions $a$ $a$ are hubs or drums $c$ $c$, which contain self-acting clutches that connect the pinions with the shaft $b$ when the machine is going forward, but disconnect them when backed; or when turning around the machine the pinion on the outside of the circle continues clutched to said shaft $b$, while the other pinion at the center of the circle may remain stationary and the shaft turn without it; or the two may turn in opposite directions. The object is to use both wheels as drivers, but, when turning around or backing the machine, to allow one or both of the pinions to become loose on the shaft, and thus not drive the cutters.

On the center, or thereabout, of the shaft $b$ there is a bevel-gear, I, that takes into and turns a bevel-pinion, $d$, on the rear end of the crank-shaft $e$. This crank-shaft projects forward, and on its extreme forward end carries a crank or wrist pin, $f$, to which the cutter-bar may be connected by a pitman in the usual manner, and by means of which connection said bar is vibrated.

A bent bar, J, having its rear end connected to the axle or to the frame at or near the axle, where there is the least motion in the machine, projects downward and forward to form at $g$ a shoe or shield to protect the end of the cutter-bar and cutters, and thence continuing forward and upward it terminates in a round shank or rod, $h$, which passes up between and is held to the frame by friction pulleys or rollers $i$ $i$, so that it may play up and down at that end, there being a button, $k$, on the top of the shank to prevent it from falling too low, the spring of the bent bar I, which is made thin, light, and elastic for that purpose, allowing the loose end $h$ of itself to play up and down.

The finger-bar K is secured to the bent bar at $m$, and said bar may be extended, as shown at K′, and, curving upward, be fastened to the main frame at $n$; or the part K′ may be a separate bar from the finger-bar, though fastened to the bent bar I and to the frame at or near the points indicated by the drawings; but in either event it should be elastic enough to allow the finger-bar to rise and fall as it surmounts the ordinary undulations or knolls on the surface of the ground.

The finger and cutter bars in this, as in the other described machine referred to as marked "A," are made light, thin, and tapering, so that in yielding to the inequalities in the ground the bars I and K' shall not be required to give to the whole motion, but said finger and cutter bars shall also be elastic within themselves, and thus take a portion of the yielding upon themselves. In slight undulations they may compensate for the whole springing; but where greater ones exist, then the bars I K' come to their aid.

I thus construct a very cheap, light, easy-draft, and effective grass-mower.

Having thus fully described the nature and object of my invention, what I claim therein as new is—

1. Connecting the bent bar J to the axle and allowing its other end free vertical motion between guides, substantially in the manner described.

2. In combination with the bent bar J for sustaining the finger and cutter bars, the continuation of the finger-bar and its attachment to the main frame, substantially in the manner and for the purpose set forth.

WALTER A. WOOD.

Witnesses:
LEONARD KING,
C. E. PETERS.